United States Patent [19]
Gore

[11] Patent Number: 5,911,816
[45] Date of Patent: Jun. 15, 1999

[54] LIPOSOMAL INK COMPOSITIONS WITH WATER-INSOLUBLE DYES AND PIGMENTS

[75] Inventor: Makarand P. Gore, Corvallis, Oreg.

[73] Assignee: Hewlett-Packard Company, Palo Alto, Calif.

[21] Appl. No.: 08/866,152

[22] Filed: May 29, 1997

[51] Int. Cl.$^6$ .................................................. C09D 11/06
[52] U.S. Cl. ..................... 106/31.34; 106/31.43; 106/31.58; 106/31.66; 106/31.75; 106/31.86
[58] Field of Search .............. 106/31.34, 31.43, 106/31.58, 31.66, 31.75, 31.86

[56] References Cited

U.S. PATENT DOCUMENTS

| | | | |
|---|---|---|---|
| 4,783,220 | 11/1988 | Gamble et al. | 106/31.59 |
| 5,117,022 | 5/1992 | Kokhar et al. | 556/137 |
| 5,234,634 | 8/1993 | Janoff et al. | 264/4.1 |
| 5,626,654 | 5/1997 | Breton et al. | 106/31.33 |
| 5,633,109 | 5/1997 | Jennings et al. | 106/31.32 |
| 5,788,749 | 8/1998 | Breton et al. | 106/31.6 |

FOREIGN PATENT DOCUMENTS

0778322A2  6/1997  European Pat. Off. ........ C09D 11/00

*Primary Examiner*—Helene Klemanski

[57] ABSTRACT

Ink compositions comprising liposome vesicles with water-insoluble dye or pigment contained therein are described. The vesicles may be unilamellar or multilamellar and may be made using standard liposome forming materials such as phospholipids or tocopherol succinate. When the present invention is used with electronic printing systems such as an ink jet printer, the generated images are sharp, fast drying, waterfast, lightfast, and of high optical density.

16 Claims, No Drawings

LIPOSOMAL INK COMPOSITIONS WITH WATER-INSOLUBLE DYES AND PIGMENTS

FIELD OF THE INVENTION

The present invention relates to ink compositions and more particularly to liposome-based ink compositions for use in electronic printing systems.

BACKGROUND OF THE INVENTION

Ink-jet printing involves projecting a stream of ink droplets on to a substrate, such as paper, to form the desired image. Although ink compositions for ink-jet printing are generally based upon water-soluble dyes, the solubility of the dyes results in less than optimal image resolution.

Most soluble dyes are soluble in water or in a mixture of water and a water-miscible solvent. When an ink composition comprising a soluble dye is used with ink jet printers, various problems arise from the tendency of the solvent, along with the dissolved dye, to migrate beyond the site of deposit. Effects associated with solvent migration include "feathering" from the overlapping of adjacent dots of ink to "print through" from the penetration of the solvent and dye into the paper. Although print resolution may be improved by using special paper coated with materials to prevent the ink from either spreading or soaking through, the special paper increases the print costs and thus is not widely used.

Unlike water-soluble dyes, pigments are substantially insoluble and remain as particles in aqueous solution. Because the pigment particles do not necessarily migrate with the solution, many of the problems associated with water-soluble dyes are avoided. Moreover, when compared with soluble dye based ink compositions, pigment based ink compositions tend to have superior waterfastness, lightfastness, image density and thermal and oxidative stability. Unfortunately, unmodified pigment particles have a tendency to agglomerate. So instead of remaining stably suspended over time, pigment particles eventually settle out of solution clogging printer jets and/or resulting in images that appear faded.

Various solutions to agglomeration have been tried including surface modification, use of dispersants, and encapsulation of pigments in polymer coats. However, because these solutions tend to be laborious, expensive, and need to be individually tailored to each pigment formulation, pigment based ink compositions are not widely used in ink jet printers. As a result, a need exists for simple and low cost ink compositions that are capable of producing high resolution images using ink jet printing methods.

SUMMARY OF THE INVENTION

In one aspect of the invention, inventive ink compositions comprise liposome vesicles with water-insoluble dye or pigment contained therein. Although the liposome vesicles may be either unilamellar or multilamellar, unilamellar vesicles are preferred. One or more substantially water-insoluble dyes are enclosed in liposome vesicles that are stably dispersed in aqueous solution. The resulting ink compositions display superior print properties such as waterfastness, lightfastness, and image density, when compared with prior art formulations. In addition to their excellent print properties, the inventive ink compositions are extremely stable, surviving even a rigorous T-cycle experiment.

In another aspect of the invention, methods for making stable liposome based ink compositions are provided. Briefly, substantially water-insoluble colorant particles are processed until an appropriate desired average particle size is reached. Subsequently, liposome forming materials are added, and using any suitable techniques, vesicles that encapsulate the insoluble colorant particles are formed. Additional post-formation steps may be undertaken to make vesicles that are relatively homogenous in size.

DETAILED DESCRIPTION OF THE INVENTION

The present invention relates to novel ink compositions comprising liposome vesicles containing one or more substantially water-insoluble pigments or dyes therein. Unlike the prior art pigment-based ink compositions, the inventive compositions are cost-effective, stable, and generally do not display the typical problems associated with pigment-based ink compositions such as agglomeration.

Colorants

As used in this disclosure, the terms "insoluble colorant" and "colorant" are used interchangeably and are intended to include any substantially water-insoluble coloring agent such as disperse dyes and pigments. The term "insoluble colorant" also includes colorants that are substantially water insoluble, but have been surface modified to be compatible with water to help stabilize the suspension of the colorants in aqueous solution. Consequently, the terms "disperse dyes" (which usually refers to a group of water-insoluble azo, diphenylamine and anthraquinone dyes), "pigments" (which usually refers dyes that are substantially insoluble in both water and organic solvents), "colorants," and "insoluble colorants" are used interchangeably unless either explicitly or implicitly rendered otherwise. Similarly, the term "insoluble dye" refers to a dye that is insoluble in water and is also used interchangeably with "colorant," "insoluble colorant," "pigment," and "disperse dye."

Disperse dyes and pigments are often identified by their respective Colour Index generic names and may be used singly or in any combination as long as the colorants are substantially water-insoluble. Illustrative examples of suitable disperse dyes for the practice of the present invention identified in this manner include but are not limited to: disperse blacks 9 and 33; disperse blues 3, 7, 27, 35, 56, 60, 73, 77, 79, 87, 102, 106, 165, 183, 281, 291, and 321; disperse brown 1; disperse green 9; disperse oranges 3, 25, 29, 30, 37, 44, 80, and 89; disperse reds 1, 4, 5, 11, 13, 15, 17, 50, 54, 60, 65, 73, 82, 86, 91, 92, 131, 135, 136, 137, 153, 167, 177, 179, and 338; disperse violet 1, 26, 28, 33, and 63; and disperse yellows 3, 5, 23, 42, 54, 64, 82, 86, 114, 126, 153, 198, and 211. Disperse dyes may also be identified by their common names. For example, depending on the manufacturer, in addition to the Colour Index designation as disperse black 9, the colorant is also known as ADC Black SN (American Dyestuff Corp.), Adis Black SN (Aashiana Dyestuffs Inc.), Akasperse Black SN (Aakash Chemicals & Dye-stuffs, Inc.), Chemilene Diazo Black (Shyamac International Inc.) and Suprasperse Black SN (Dyerich Chemical Corp.), among others.

Illustrative examples of suitable pigments that are identified with respect to the Colour Index include but are not limited to: pigments black 1, 7, 11, and 31; pigments blue 1, 9, 14, 15, 16, 27, 28, 29, 36, 60, and 61; pigments brown 24, 29, and 31; and pigments green 1, 2, 7, 36, and 50; pigments orange 5, 13, 16, 34, 36, 43, 46, 67, and 69; and pigments red 2, 3, 4, 5, 8, 17, 19, 22, 23, 31, 38, 48, 49, 52, 57, 63, 81, 88, 100, 101, 104, 112, 122, 123, 146, 149, 170, and 179; pigments violet 2, 3, 9, 19, 23, and 29; and pigments yellow 1, 3, 12, 13, 14, 17, 34, 65, 74, 83, and 97. Similarly, pigments may also be known by their common names. For example, pigment orange 5 is also known as Dinitraniline Sunbrite Orange 5 (Sun Chemical Corp.), Monolite Orange RE HD Pst. (ZENECA Colours), Orange DNA Orange (Fabricolor Inc.), and Sico Orange L-3052 (BASF Corp.).

Surface modified insoluble colorants include, but are not limited to, those that have been chemically modified to add hydrophilic surface groups like sulfates, sulfonates, hydroxyls, aldehydes, hydrated aldehydes, and carboxylates. For examples, many such surface modified insoluble colorants are commercially available like Microjet Black (carboxylated modified) from Orient Chemicals, Cab-o-jet™ 200 (sulfonate modified), and Cab-o-jet™ 300 (carboxylate modified) from Cabot.

Other disperse dyes, pigments, and modified insoluble colorants may also be used. Preferably, the particle size of the insoluble colorant is less than about 500 nm in diameter and more preferably between about 50 nm and 250 nm in diameter. However, pigments that are homogenous in size and are between about 90 nm and about 110 nm are particularly preferred. The colorant is present in the ink composition in an effective amount, generally from about 1 to about 8 weight percent and more preferably from about 3 to about 5 weight percent, although the amount chosen may be outside of these ranges.

Liposome Forming Material

Liposome vesicles are well described in the literature, particularly in the context as drug delivery systems. Although other ingredients may be necessary for the proper formation of liposome vesicles, as used in this disclosure, the term "liposome forming materials" refers to the one or more primary components that actually comprise the liposome vesicles.

Briefly, the liposome forming materials typically have a polar end and a non-polar end, relative to each other. Driven by hydrophobic and Van der Waals forces, the molecules organize themselves into a "bilayer," a sheet-like structure two molecules deep and oriented in such a way that each non-polar end interacts with another non-polar end and the polar ends are exposed to aqueous solution. In liposomes, these "bilayers" form sacs or vesicles containing an enclosed aqueous compartment. Unilamellar vesicles are formed from one such bilayer and multilamellar vesicles have multiple concentric bilayers. However, because unilamellar vesicles tend to encapsulate pigment particles more efficiently, they are preferred.

Because of their ease of formation, liposomes formed from tocopherol succinate (also known as vitamin E succinate) are particularly preferred. Generally, multilamellar vesicles may be formed simply by shaking a mixture containing a vitamin E succinate and unilamellar vesicles may be formed by either sonicating a mixture containing multilamellar vesicles or by the use of a French press. When adapted for use in the present invention, particularly good results have been obtained using a combination of vitamin E succinate and an amine such as tris(hydroxymethyl) amino methane or 2-amino-ethyl-1,3 propane diol. A more detailed description of methods relating to tocopherol vesicles is found in U.S. Pat. No. 5,234,634 by inventors Janoff et al. which is hereby incorporated by reference.

However, any suitable liposome forming material such as standard lipids may be used to make the liposome vesicles of the present invention. Illustrative examples of liposome forming materials include but are not limited to phosphatidycholines, phosphatidic acids, phosphatidylserines, phosphatidylethanolamines, sphingolipids, phosphatidylglycerols, sphingomyelins, cardiolipins, glycolipids, gangliosides, cholesterol, cerebrosides, polyethylene glycol esters and ethers of fatty acids, and mixtures thereof. Preferred compounds include soybean and egg yolk phosphatidylcholines.

Moreover, practice of the present invention does not require high grade liposome forming materials. For example, good results routinely have been obtained with phospholipids of less than 70percent grade. Even phospholipids having a grade as low as 40percent have been successfully used. Because of the anticipated savings in the costs of materials, lower grade materials that form suitable liposome vesicles are generally preferred.

Typically, the liposome forming materials comprise between 1 to about 30percent by weight of the final ink composition. Preferred amounts are such that the ratio of colorant to liposome forming material is between about 2:1 and about 3:1 by weight. Particularly preferred amounts of liposome forming materials are equal to or less than about 4 weight percent.

Encapsulation Method

Any standard method for enclosing, or encapsulating substantially water-insoluble materials may be used. In addition, although both unilamellar and multilamellar liposome vesicles may be used, because of the greater encapsulation efficiency, unilamellar vesicles are preferred. A publication that describes many standard materials and techniques relating to liposomes is *Liposome Technology*, published by CRC Press in 1993, which is incorporated by reference.

However, in the preferred method, a microfluidizer is used. The microfluidizer is first used to grind the colorant particles to the appropriate size in a grinding liquid, which may be water or may additionally include one or more water-miscible organic solvents. Although not necessary, it is preferred that the grinding liquid be a component of the final ink composition.

When the appropriate pigment size is reached, the liposome forming materials (preferably in solid form) are added to the mixture of the pigment and grinding liquid. The grinding process is continued until the resulting liposome vesicles have the desired mean diameter. At this point, the mixture is filtered through a 1 micron filter and the concentration of the colorant and liposome forming materials are adjusted to the appropriate levels.

Optional Ingredients

Other ingredients may be added to the ink compositions. For example water-soluble or water-miscible organic solvent which usually tends to serve as a humectant may be included. Illustrative examples include but are not limited to polyhydric alcohols such as ethylene glycol, propylene glycol, butylene glycol, triethylene glycol, 1,2,6-hexanetriol, thiodiglycol, hexylene glycol, and diethylene glycol; diols such as butanediol, pentanediol, and hexanediol; glycol esters such as propylene glycol laureate; glycerol; and polyalkyl glycols such as polyethlene glycol; an lower alkyl ethers of polyhydric alcohols such as ethylene glycol monomethyl ether, ethylene glycol monoethyl ether, diethylene glycol monoethyl ether, triethylene glycol monomethyl ether, triethylene glycol monobutyl ether, and mixtures thereof. Other suitable water-miscible organic solvent include alcohols such as methanol, ethanol, propanol, and butanol; ketones such as acetone; ethers such as tertrahydrofuran and dioxane; esters such as ethyl acetate, sulfolanes, N-methyl pyrrolidone, lactones, lactams such as 2-pyrrolidone, 1-methyl-2-pyrrolidone, 1-(2-hydroxyethyl)-2-pyrrolidone, and mixtures thereof. One or more of these water-soluble organic solvents may be present in an amount between about 0 to about 70 percent, more preferably between about 10 and 40 percent, although the amount maybe outside of these ranges.

The final ink composition may include any combination of property enhancing agents such as amine oxides and amines like 2-dimethyl amino 2-methyl 1-propanol. Other illustrative examples include but are not limited to antifoaming agents, surface tension adjusting agents, rheology adjusting agents, pH adjusting agents, drying agents, and biocides. Additional examples include agents that enhance any combination of waterfastness, lightfastness or smearfastness of the final ink composition. These property enhancing agents are well known in the art and the precise amount that is added will depend on the particular agent. However, the property enhancing agent may be between about 0 and 40 weight percent and more preferably between about 2 and 10 weight percent.

Properties of Inventive Ink Compositions

The ink compositions of the present invention are generally suitable for use in ink jet printing. Typically, the ink viscosity is no more than about 5 centipoise and more preferably is between about 1 and 3 centipoise, although the value may be outside of these ranges. In addition, the surface tension of the final composition is typically between about 25 to about 60 dynes per centimeter, and more preferably between about 35 to about 50 dynes per centimeter.

Specific embodiments of the invention will now be described in detail. These examples are intended to be illustrative, and the invention is not limited to the materials conditions, or process parameters set forth in these embodiments. All parts and percentages are by weight unless otherwise indicated.

EXAMPLE 1

General Protocol

Colorants are ground until a desired average particle size reached using a microfluidizer and an appropriate grinding liquid. The grinding process usually takes approximately 5 minutes at an operating pressure of about 10,000 psi. However, any combination of operating pressure between 500 and 18,000 psi and time between 5 and 200 minutes may be used to reach the desired particle size.

Once the colorants are at the appropriate particle size, liposome forming materials (in solid form, if possible) are added to the mixture of colorant and grinding liquid. The grinding process is then allowed to continue for about 5 minutes to 1 hour until the resulting liposomes are approximately equal to or less than the critical size necessary for T-cycle stability. The critical size is a function of liposome composition and easily determined by performing T-cycle runs of liposomes with varying sizes. For example, vitamin E succinate systems have a critical size of approximately 140 nm and phosphatidylcholine systems have a critical size of approximately 170 nm. As a general rule, liposomes larger than their respective critical sizes do not form stable ink compositions as judged by T-cycle stability.

Ink compositions are prepared by filtering the liposomal mixture through a 1 micron filter and then adding sufficient amounts of water and/or other solvents to the desired concentration of liposomal materials and colorant. Typically, the liposome forming material is less than or equal to about 4 percent and the colorant concentration is less than about 8 percent, and more preferably between about 3 percent and about 5 percent. If desired, any combination of ink modifying agents such as amine oxides and amines (i.e. 2-dimethylamino 2-methyl 1-propanol), antifoaming agents, surface tension adjusting agents, rheology adjusting agents, drying agents, biocides, and humectants, also may be added to the final formulation of the ink composition.

EXAMPLE 2

T-Cycling Experiments

All experiments were performed on a Thermotron T-cycling machine. A typical T-cycle run lasts approximately 35 hours and comprises the following temperature cycles. Samples are placed in a chamber pre-cooled to −40° C. During interval one, the initial chamber temperature of −40° C. is maintained for four hours. Interval two is a 30 minute ramp from −40° C. to 70° C. During interval three, the chamber temperature of 70° C. is maintained for four hours. Interval four is a 30 minute ramp back down to −40° C. This cycle of four intervals is continued fifteen times. At the end of the run, the chamber returns to room temperature.

Small amounts of sedimentation sometimes result from the T-cycle experiments. However, this is mostly due to the settling of unencapsulated colorants since sedimentation is virtually eliminated if the supernatant is T-cycled again.

EXAMPLE 3

Preparation of Ink Using Surface Modified Pigment

A mixture of soy lecithin (12.5 g) (available under the brand name Centrolex F from Central Soy Co., Fort Wayne, Ind.), sodium cholate (6.25 g), diethylene glycol (50 g), and water (431 g) were sonicated in a cooling bath with ice-water mixture, at setting 4 with a pulse program of 30 sec on, 30 sec off cycle for 0.5 h, using Heat Systems Sonicator XL instrument, and then fluidized for 0.5 h at operating pressure of 10,000 psi.

This vehicle (40 g) was mixed with a concentrate (10 g) containing 19.9 percent of surface modified pigment obtained form Orient Chemicals (65 Springfield Avenue, Suite 311, Springfield, N.J. 07081) under the name of Microject Black, and the container was rolled on a roller mill for 0.5 h and fluidized for 0.5 h. at operating pressure of 10,000 psi. The mixture was filtered through a 1 micron filter to prepare the final ink formulation. The ink composition had a viscosity of 1.78 and surface tension of −39 dynes/cm. The ink composition was T-cycle stable and generated good quality prints when used with a 660 Hewlett Packard DeskJet printer. The generated images had excellent waterfastness, and good smearfastness.

EXAMPLE 4

Preparation of Black Ink

A mixture of 36 g of Degussa FW 18 Carbon Black, 36.0 g DEG, 0.72 percent Proxel GXL as a biocide, and 233.9 g of deionized water was microfluidized from 15 minutes at 10,000 psi. Approximately 300 ml of a solution containing about 3.54 percent of vitamin E succinate and 0.82 percent of tris was added. The mixture was then microfluidized again until the average particle size reached approximately 124 nm and filtered through a 1 micron filter.

The resulting filtrate was used to prepare two different ink compositions. Composition A comprised: 4 percent DEG; 1 percent Triton CF21; 2.12 percent vitamin E carrier (carrier refers to mixture of tris and vitamin E succinate); 5 percent Carbon Black; and water making up the balance. The ink composition had a viscosity of 1.70 cps and a surface tension of 29.4 dynes/cm.

Composition B comprised: 4 percent DEG; 1 percent Triton CF21; 2 percent isopropanol; 2 percent glycerol; 2.12 percent vitamin E carrier; and water making up the balance. The ink composition had a viscosity of 2.0 cps and a surface tension of 29.4 dynes/cm.

Both Compositions A and B printed well on Hewlett Packard 600 series printers generating completely waterfast prints with good smear and lightfast properties.

It is to be understood that while the invention has been described above in conjunction with preferred specific embodiments, the description and examples are intended to illustrate and not to limit the scope of the invention, which is defined by the scope of the appended claims.

It is claimed:

1. An ink composition, comprising:

liposome vesicles wherein said vesicles are formed from tocopherol succinate and an amine;

at least one substantially water-insoluble colorant enclosed within the liposome vesicles; and an aqueous solution, the liposome vesicles being stably dispersed in the aqueous solution.

2. The ink composition as ion claim 1 wherein the amine is tris (hydroxymethyl) amino methane.

3. The ink composition as in claim 1 wherein the water-insoluble colorant is either a disperse dye or a pigment.

4. The ink composition as in claim 3 wherein the water-insoluble colorant is in the form of particles having an average size between about 90 nm and about 110 nm and the liposome vesicles is less than or approximately equal to 140 nm in diameter.

5. The ink composition as in claim 1 wherein the vesicles are formed from a lipid or a mixture of lipid selected from the group consisting of phosphatidylcholine, phosphatidic acids, phosphatidylserines, phosphatidylethanolamines, sphingolipids, phosphatidylglycerols, sphingomyelins, cardiolipins, glycolipids, gangliosides, cholesterol, cerebrosides, tocopherol, and polyethylene glycol esters and ethers of fatty acids.

6. The ink composition as in claim 1 wherein the aqueous solution includes a water-miscible organic solvent.

7. The ink composition as in claim 1 further comprising:

a property enhancing agent.

8. The ink composition as in claim 1 further comprising:

one or more of an antifoaming agent, a surface tension adjusting agent, a rheology adjusting agent, a pH adjusting agent, a drying agent, a humectant, and a biocide.

9. The composition as in claim 1 wherein the vesicles remain stably dispersed in solution after a T-cycle experiment comprising at least 15 cycles of temperature changes from about −40° C. to about 70° C. within approximately 30 minutes.

10. A method for producing a stable liposomal based ink composition, comprising:

grinding at least one substantially insoluble colorant in aqueous solution until the colorant has an average particle size between about 90 nm and about 110 nm;

contacting tocopherol succinate and tris(hydroxymethyl) amino methane in solid form with the ground pigment; and, grinding the colorant with the liposome forming materials to form liposome vesicles having an average diameter of less than or approximately equal to 140 nm.

11. The method as in claim 10 further comprising:

adjusting the concentration of the liposomal forming materials in the ink solution to less than about 4 percent.

12. The method as in claim 10 wherein the colorant is either a disperse dye or a pigment.

13. The method as in claim 10 further comprising:

adding a water-miscible organic solvent to the aqueous solution.

14. The method as in claim 10 wherein the grinding is performed in a microfluidizer.

15. The method as in claim 10 further comprising:

adding a property enhancing agent.

16. The method as in claim 10 further comprising:

adding one or more of an antifoaming agent, a surface tension adjusting agent, a rheology adjusting agent, a pH adjusting agent, a drying agent, a humectant, and a biocide to the ink solution.

* * * * *